United States Patent [19]

Haldimann et al.

[11] 4,395,074
[45] Jul. 26, 1983

[54] CONNECTING SPIKE FOR FLEXIBLY CONNECTING TWO CHAIN LINKS OF A TRACK

[75] Inventors: Walter Haldimann, Pfäffikon; Fritz Held, Forch; Rudolf Fehr, Pfäffikon, all of Switzerland

[73] Assignee: Huber & Suhner AG, Herisau, Switzerland

[21] Appl. No.: 165,194

[22] Filed: Jul. 1, 1980

[51] Int. Cl.³ .................................. B62D 55/20
[52] U.S. Cl. ............................. 305/43; 305/59; 403/228; 403/224
[58] Field of Search ............... 305/41, 42, 43, 59; 403/220, 224, 225, 228

[56] References Cited

U.S. PATENT DOCUMENTS 2,181,136  11/1939  Knox .......................... 305/42 UX
2,297,483   9/1942  Kuhne ......................... 403/224
2,772,104  11/1956  Thiry .......................... 403/225

Primary Examiner—David A. Scherbel
Attorney, Agent, or Firm—Cooper, Dunham, Clark, Griffin & Moran

[57] ABSTRACT

A connecting spike (16, 17, 18) is used for flexibly interconnecting two chain links (1, 2) of a track, specifically for tanks. The spike comprises a metal bolt (8) with a vulcanized-on rubber sheathing (13). On inserting spike (16) into bores (5) of chain links (1, 2), it is elastically deformed. Sheathing (13) is one-part developed and has thicker and thinner points (14 resp. 15), the material strengths of which are higher ($S_o$) resp. lower ($S_2$) than is the difference between the radius of bolt (8) and that of bores (5). This improvement provides increased life and reduced chain expansion because the connecting spike completely fills up the bores.

3 Claims, 10 Drawing Figures

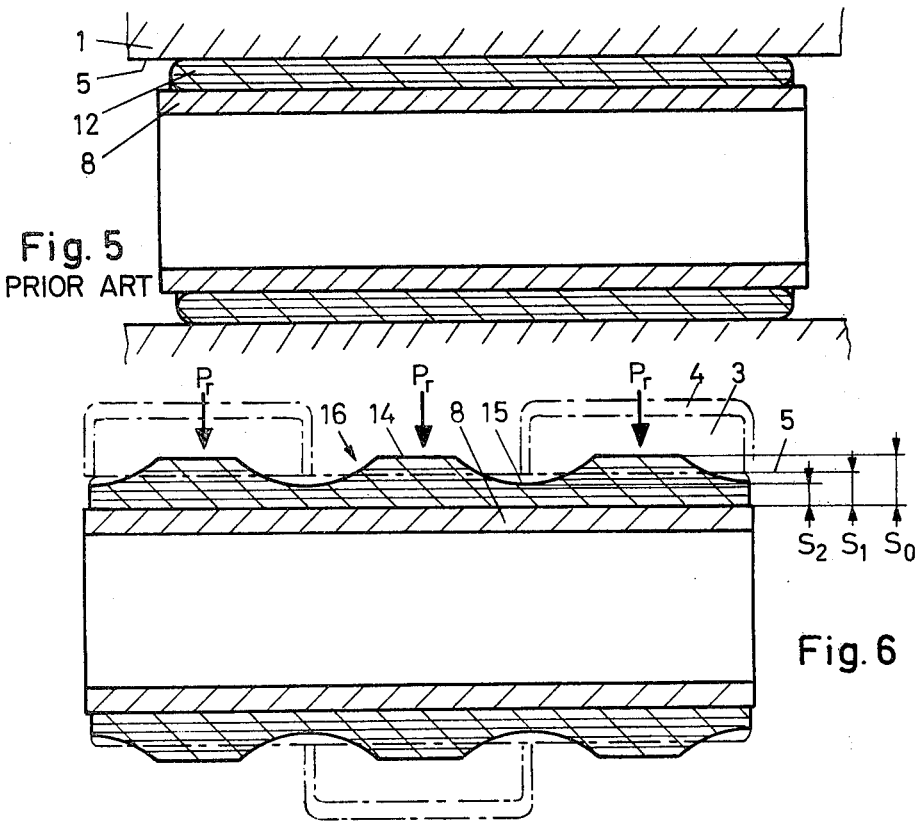
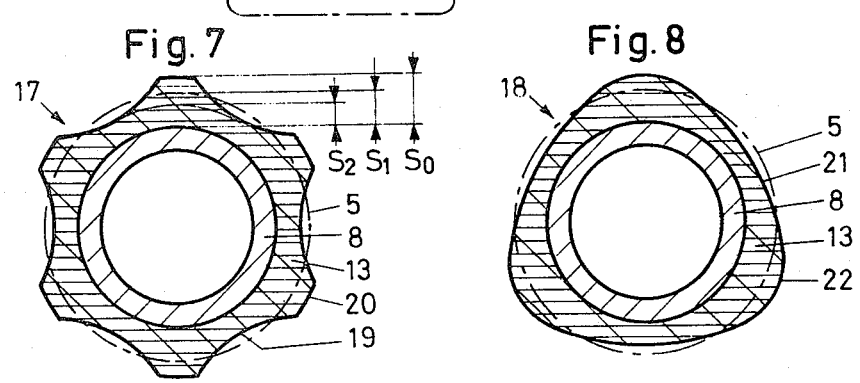
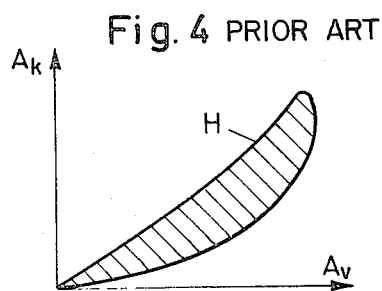
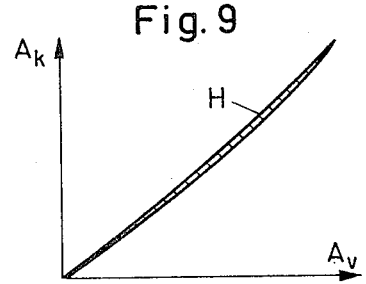

CONNECTING SPIKE FOR FLEXIBLY CONNECTING TWO CHAIN LINKS OF A TRACK

This invention relates to a connecting spike for flexibly connecting two chain links of a track, where said spike comprises a metal bolt, and permanently bonded thereon an elastic sheathing, which on inserting said spike into the chain link bores is elastically deformed.

Prior art disclosures provide for the flexible interconnection of full-track vehicular chain links by means of single steel bolts. With chains under heavy loads, e.g., for tanks, instead of such steel bolts connecting spikes are used, which comprise a steel bolt core or steel envelope with vulcanized-on rubber rings. On inserting the latter into the chain link bores, the rubber rings are deformed and in that way generate a radial stress. Among those skilled in the art, such conventional spikes are known as "torsiblocs."

With full-track vehicles, the advantage of such connecting spikes are less wear, substantially reduced noise, and because of the produced damping effect, less vibration. But connecting spikes such as these also have certain drawbacks, primarily under high loads. The deformation produced pinch folds are under a higher tension stress, which leads to local overloads.

Furthermore, there are rubber-on-rubber friction points presented at the contact places of pinched rubber elements, which can result in excessive overheating and the destruction of the elastic sheathing and thus of the system itself. Also, the rubber-on-steel friction points represent a weak spot, since both steel envelope and rubber are under a higher wear load. Finally, the radial rigidity in most cases is insufficient and results in higher chain stretching. Said radial rigidity cannot be increased easily by reinforcing radial forces, since the rubber is thus overstressed.

With conventional "torsiblocs", the bore fill-up space with rubber is about 94%. Radial rigidity could be increased also by boosting the fill-up degree, e.g., to 100%. The effect, however, would be a still stronger overheating of various friction points.

A substantial drawback of conventional connecting spikes is the fact that they operate in an axially unstable state of equilibrium, i.e., they allow themselves to be axially shifted up to a few millimeters even under low axial force effects. The axial hysteresis, therefore, is extremely high, resp. the axial rigidity generally is too low, so that as a result the connecting spike can drift in a lateral direction.

Attempts made to accomplish a 100% rubber fill-up include that of a one-piece tubular sheathing. Such design produced high radial and axial rigidity and a relatively low prestress, so that the rubber had a still high operating reserve available. But in order to limit prestress forces even to some acceptable degree of precision, the manufacturing tolerances of steel parts and rubber rings—prior to the vulcanizing stage—must be set extremely narrow. This makes an economically feasible fabrication almost impossible.

The object of the invention is to produce a connecting spike for the flexible interconnection of two chain links, where the above-mentioned drawbacks are eliminated. According to the invention, this is effected by a one-part developed sheathing having thicker and thinner points, the material strengths of which are higher respectively lower than is the difference between bolt radius and bore radii.

The conventional embodiments of the subject invention are explained in more detail below with reference to FIGS. 1-5 of the drawings, based on conventional solutions; then exemplified embodiments of the invention are described in more detail with reference to FIGS. 6-9 of the drawings.

In the drawings, presented schematically,

FIG. 4 illustrates the shape of the axial hysteresis characteristic of the "torsibloc" according to FIG. 2;

FIG. 5 illustrates a theoretical embodiment variant of a connecting spike with high fill-up volume;

FIG. 6 illustrates a longitudinal cut through one embodiment of a connecting spike according to the invention;

FIG. 7 illustrates a cross-section through another embodiment of a connecting spike according to the invention;

FIG. 8 illustrates a cross-section through yet another embodiment of the connecting spike according to the invention;

FIG. 9 illustrates an axial hysteresis characteristic of the connecting spike according to the invention.

Figure 1:
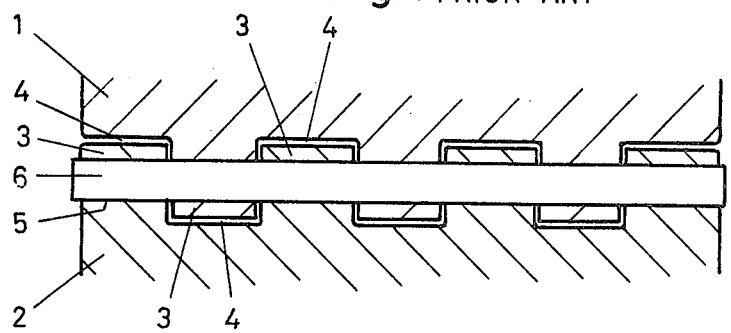
FIG. 1 illustrates the flexible interconnection of two chain links by a conventional steel bolt.

In FIG. 1 both chain links of a track are designated as 1 and 2. On adjoining junction edges of chain links 1, 2, there are projections 3 and recesses 4 so alternately arranged that the projections 3 of one chain link 1 extend into the recesses 4 of the other chain link 2. Projections 3 are provided with bores 5, which are aligned with each other and into which a steel bolt 6 is inserted in the conventional way.

Figure 2:
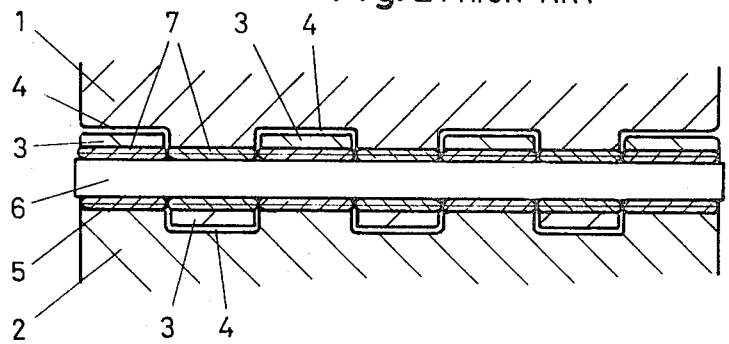
FIG. 2 illustrates the flexible interconnection of two chain links with connecting spike and built-in "torsibloc"
Figure 3:
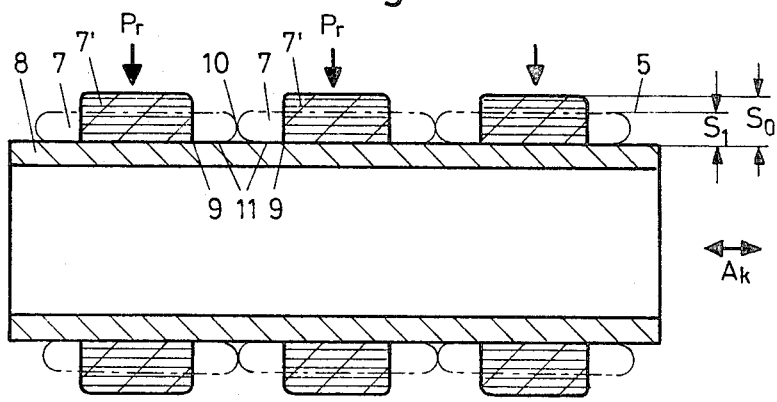
FIG. 3 illustrates a longitudinal cut through a "torsibloc" according to FIG. 2 on an enlarged scale.

With the conventional "torsibloc" connecting spike shown in FIGS. 2 and 3, rubber rings 7 are vulcanized onto metal core 6, 8. The steel core can comprise a solid bolt 6 or steel box 8. In FIG. 3 the rubber rings in a non-deformed state are designated as 7' and those in a deformed state as 7.

On inserting the connecting spike into chain links, the rubber rings 7 are elastically deformed from their original thickness $S_o$ to thickness $S_1$ under the effect of radial deformation pressure $P_r$. Thereby lateral pinch folds 9 are produced, the edges of which touch and form rubber-on-rubber friction points 10, which under traveling conditions strongly heat up and wear off. Also, the rubber-on-steel friction points strongly wear out.

Under the effect of axial forces $A_k$, the conventional "torsiblocs" can be easily shifted in an axial direction by a few millimeters. The hysteresis characteristic H, therefore, according to FIG. 4 is extremely wide. In the latter figure, the axial force $A_k$ is plotted as ordinate and the axial shift $A_v$ as abscissa.

In FIG. 5 finally the embodiment is shown with a tubular, elastic sheathing 12 for accomplishing a 100% fill-up. But as mentioned, the manufacturing precision requirements for steel parts and nonvulcanized rubber are too high for commercially feasible fabrication.

For the preferred embodiment of connecting spike 16 according to this invention, a rubber sheathing 13 is vulcanized onto the steel capsule 8 over the latter's entire length. The wall strength of sheathing 13 varies because the latter has thick and thin places 14 respectively 15, the wall strengths $S_o$ respectively $S_2$ of which are higher respectively lower than is the difference $S_1$ between bore radius and bolt radius, i.e., $S_1$ represents the stand-off distance of the bolt surface from the internal surface of bore 5.

Raised points 14 involve annular ribs, which on inserting connecting spike 16 into bores 5 of chain links 1, 2 are radially compressed. Arranged between annular ribs 14, there are recesses 15, which are developed as ring grooves with a circular-segmental cross-section. The deformed material of annular ribs 15 is elastically displaced—under the effect of radial force $P_r$—toward recesses 15 and fills up the latter. This way an at least approximately 100% fill-up of free bore space by the rubber sheathing is accomplished.

With the embodiment of connecting spike 17 according to FIG. 7, the sheathing is provided with raised, longitudinal ribs 20, between which longitudinal channels 19 having a circular-segmental cross-section are arranged. Here, too, the rib wall strength $S_o$ exceeds the distance $S_1$, and the latter again exceeds the wall strength $S_2$ of the sheathing in the area of the groove bottom.

Figure 10:
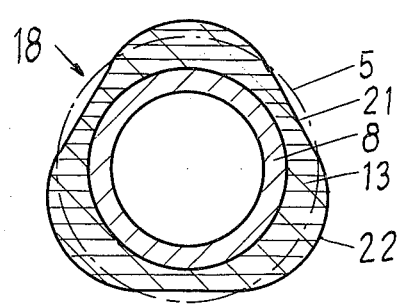
FIG. 10 illustrates a cross section through yet another embodiment of the connecting spike according to the invention.

The connecting spike 18 shown in FIG. 8 has an approximately triangular cross-section where the rounded edges 22 form the projections and the central areas of connecting lines 21 the recesses. In an analogous way, the connecting spike could have a polygonal cross-section where the connecting lines of the edges could be straight, as shown in FIG. 10, or inward or outward cambered.

Because of the invention's embodiments of the connecting spike, the prestress $$V=(S_o-S_1)/S_o$$

can be kept at a low level, so that after its deformation the rubber sheathing has a high operating reserve available. No pinch folds are formed as with conventional "torsiblocs", because the sheathing is of a one-part (not tripartite) type. Thus also, no rubber-on-rubber friction points are generated with high overheating and wear effects. Also, any rubber-on-steel friction points are eliminated. The projections and recesses on the sheathing are so dimensioned that following a deformation a complete fill-up of free bore space in the chain links is accomplished. The tolerance requirements for steel parts are less stringent than with the embodiment described in FIG. 5.

Radial rigidity is boosted by a multiple, i.e., the chain stretch-out is sharply reduced. The insertion force effective on loading the connecting spikes into chain links are reduced, the rubber encounters less friction and, therefore, flows easier into the bores without disaggregation on slotting. The connecting spike is axially stable, which blocks any drifting in an axial direction and as a result the hysteresis loop, as shown in FIG. 9, is very small.

What is claimed is:

1. Connecting spike for flexibly connecting the chain links of a track, where said spike comprises a metal rod, and an integral elastic sheathing undetachably bonded thereto, said sheathing having thicker and thinner portions, said thicker portions being provided by longitudinal ribs and said thinner portions being provided by longitudinal channels having an approximately circular-segmented cross-section, such that the radius of the cross section of said spike at said thicker portions is greater and at said thinner portions is smaller respectively than the radius of the chain link bore of said track, said sheathing upon insertion of the spike into said chain link bore being elastically deformed such that axial shift of said spike within said bore is substantially prevented.

2. Connecting spike for flexibly connecting the chain links of a track, where said spike comprises a metal rod, and an integral elastic sheathing undetachably bonded thereto, said sheathing having thicker and thinner portions, said thicker portions being provided by annular ribs and said thinner portions being provided by annular channels having an approximately circular-segmented cross-section, such that the radius of the cross section of said spike at said thicker portions is greater and at said thinner portions is smaller respectively than the radius of the chain link bore of said track, said sheathing upon insertion of the spike into said chain link bore being elastically deformed such that axial shift of said spike within said bore is substantially prevented.

3. Connecting spike for flexibly connecting the chain links of a track, where said spike comprises a metal rod, and an integral elastic sheathing undetachably bonded thereto, said sheathing presenting a polygonal-shaped cross-section having rounded corners and wherein the connecting lines of said corners are substantially straight, said sheathing having thicker portions provided at said rounded corners and thinner portions provided at the central portion of said connecting lines, such that the radius of the cross section of said spike at said thicker portions is greater and at said thinner portions is smaller respectively than the radius of the chain link bore of said track, said sheathing upon insertion of the spike into said chain link bore being elastically deformed such that axial shift of said spike within said bore is substantially prevented.

* * * * *